United States Patent
Takahashi et al.

(10) Patent No.: US 8,327,488 B2
(45) Date of Patent: *Dec. 11, 2012

(54) ACTUATOR AND ELECTRIC TOOTHBRUSH USING THE SAME

(75) Inventors: Yuki Takahashi, Tama (JP); Shigenori Inamoto, Tama (JP); Kensuke Yamada, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 840 days.

This patent is subject to a terminal disclaimer.

(21) Appl. No.: 12/318,512

(22) Filed: Dec. 30, 2008

(65) Prior Publication Data

US 2009/0320220 A1    Dec. 31, 2009

(30) Foreign Application Priority Data

Jun. 25, 2008    (JP) .................................. 2008-166534

(51) Int. Cl.
    *A46B 13/02*    (2006.01)
(52) U.S. Cl. .................. 15/22.1; 15/21.1; 15/23; 15/24; 15/28; 15/167.1; 15/105
(58) Field of Classification Search .................... 15/22.1, 15/21.1, 167.1, 105, 23, 24, 28
    See application file for complete search history.

(56) References Cited

U.S. PATENT DOCUMENTS

| | | | |
|---|---|---|---|
| 4,736,485 A * | 4/1988 | Egner-Walter et al. | 15/250.202 |
| 5,189,751 A | 3/1993 | Giuliani et al. | |
| 5,721,723 A * | 2/1998 | Uchimaru et al. | 720/669 |
| 2005/0235438 A1* | 10/2005 | Motohashi et al. | 15/22.1 |
| 2006/0168745 A1* | 8/2006 | Kobayashi et al. | 15/22.1 |

FOREIGN PATENT DOCUMENTS

| | | |
|---|---|---|
| EP | 1 923 985 A1 | 5/2008 |
| JP | 9205763 * | 8/1997 |
| JP | 3243529 | 10/2001 |
| JP | 2002-078310 | 3/2002 |
| JP | 2005-95739 A | 4/2005 |
| JP | 2006-14514 A | 1/2006 |
| WO | WO 92/16160 | 10/1992 |
| WO | 2007/017823 A1 | 2/2007 |

OTHER PUBLICATIONS

Notice of the Reasons for Rejection dated Apr. 20, 2010, on corresponding Japanese Patent Application.

* cited by examiner

*Primary Examiner* — Robert Scruggs
(74) *Attorney, Agent, or Firm* — Washida & Associates (57) ABSTRACT

An actuator allows miniaturization by realizing back-and-forth rotating motion of, for example, an electric brush without a drive transmitting mechanism which constitutes a separate entity from a drive source. In a movable body (160) of this actuator (100), an outer yoke (110) is provided with inner wall planes (112a and 113a) located opposing each other spaced a predetermined interval apart and magnets (121 and 123) of different magnetic poles opposing each other in the inner walls planes (112a and 113a). The movable body (160) has a center yoke (140) located between the magnets (121 and 124) through air gaps. The movable body (160) is provided with a shaft (150). The fixed body (180) has a coil (170) which is located in the air gaps and which circles the center yoke (140). The fixed body (180) movably supports the movable body (160) through elastic bodies (190). An alternating current supplying section (195) supplies to the coil (170) the alternating current of a frequency virtually equal to the resonance frequency of the movable body (160).

6 Claims, 11 Drawing Sheets

ACTUATOR AND ELECTRIC TOOTHBRUSH USING THE SAME

CROSS REFERENCE TO RELATED APPLICATIONS

The disclosure of Japanese Patent Application No. 2008-166534, filed on Jun. 25, 2008, including the specification, drawings and abstract, is incorporated herein by reference in its entirety.

BACKGROUND OF THE INVENTION

1. Field of the Invention

The present invention relates to an actuator used in, for example, an electric toothbrush and electric sonic wave toothbrush.

2. Description of the Related Art

Conventionally, for electric toothbrushes including electric sonic wave toothbrushes, bass brushing toothbrushes that place the brush obliquely (at about forty five degrees) on the boundary part between teeth and gum and vibrate the brush left and right in linear back-and-forth motion, and rolling brushing toothbrushes that move in back-and-forth (backward and forward) rotating motion in a range of a predetermined angle around the shaft and rotating the brush from the gum toward teeth, are known.

For the drive of these toothbrushes, structures are commonly employed for making linear back-and-forth motion or back-and-forth rotating motion for rotation of a rotating DC motor, which makes typical rotation around the shaft, through a motion direction converting mechanism. Further, other than these structures, structures for moving a toothbrush in linear back-and-forth motion by a linear drive actuator or structures for moving a toothbrush in back-and-forth rotating motion by resonating a resonance vibrating mechanism, which constitutes a separate entity from the drive source, by the vibration of the actuator, are known.

As disclosed in Japanese Patent Application Laid-Open No. 2002-078310, the structures for moving a toothbrush in linear back-and-forth motion by a linear drive actuator realize bass brushing by directly producing back-and-forth vibration in the axial direction of an output shaft directly connected with the toothbrush part. According to this structure, there is little power loss due to the motion converting mechanism and furthermore high-speed vibration can be performed.

Further, as disclosed in Japanese Patent No. 3243529, a structure with an actuator and a resonance vibrating mechanism which constitutes a separate entity from the drive source, realizes rolling brushing by exciting the resonance vibrating mechanism with a lever arm by a driving means with electric magnets and permanent magnets and by making the lever arm directly connected coaxially with the toothbrush part move in bobble-head motion.

By the way, there is a demand for an electric toothbrush that realizes rolling brushing, and there is also a demand for miniaturization of the drive part of the toothbrush because making slimmer a handle part in which the drive part and driving the rolling brushing toothbrush is demanded.

However, to realize rolling brushing using a motor that makes typical rotation around the shaft, a motion direction converting mechanism for converting the rotation of the motor into back-and-forth rotating motion, is required in addition to the motor. Further, to realize rolling brushing using a linear drive actuator as shown in Japanese Patent Application Laid-Open No. 2002-078310, a torque generating mechanism (i.e. drive source) is required in addition to the linear drive actuator.

Further, the structure disclosed in Japanese Patent No. 3243529 requires a drive source and a resonance vibrating mechanism apart from the drive source.

In this way, to use a motor or linear drive actuator for the drive source of an electric toothbrush, conventional structures need to secure spaces for locating the drive source and, in addition, the motion direction converting mechanism, torque generating mechanism or resonance vibrating mechanism, apart from the drive source and therefore there is a problem that miniaturization of a toothbrush is difficult.

Further, if a drive transmitting mechanism such as a motion direction converting mechanism which constitutes a separate entity from an actuator such as a motor is provided in the drive part of the toothbrush, there are concerns that, in the drive transmitting mechanism, noise is generated and efficiency deteriorates due to occurrence of loss in transmitted power, and therefore countermeasures for these need to be taken into account.

SUMMARY OF THE INVENTION

It is therefore an object of the present invention to provide a small actuator and electric toothbrush that realizes back-and-forth rotating motion of, for example, an electric toothbrush without a drive transmitting mechanism which constitutes a separate entity from the drive source.

The present invention achieves the above object by employing a configuration including: a movable body that has: an outer yoke, which has inner wall planes located opposing each other spaced a predetermined interval apart, and in which magnets of different magnetic poles are provided opposing each other in the opposing inner wall planes; and a magnetic body located between the magnets through air gaps; an output shaft provided in the movable body; a fixed body that has a coil which is located in the air gaps and which encircles the magnetic body; an elastic support part that movably supports the movable body in the fixed body; and an alternating current supplying section that supplies to the coil an alternating current of a frequency substantially equal to a resonance frequency of the movable body. Further, the present invention achieves the above object by employing a configuration including: an actuator having the above configuration; and a toothbrush part that is coupled to an output shaft of the actuator on the same shaft center as the output shaft and that comprises in a head part a hair bundle part provided orthogonal to an axial direction.

DETAILED DESCRIPTION OF THE PREFERRED EMBODIMENT

Hereinafter, embodiments of the present invention will be described in detail with reference to the accompanying drawings.

(Embodiment 1)

Figure 1:
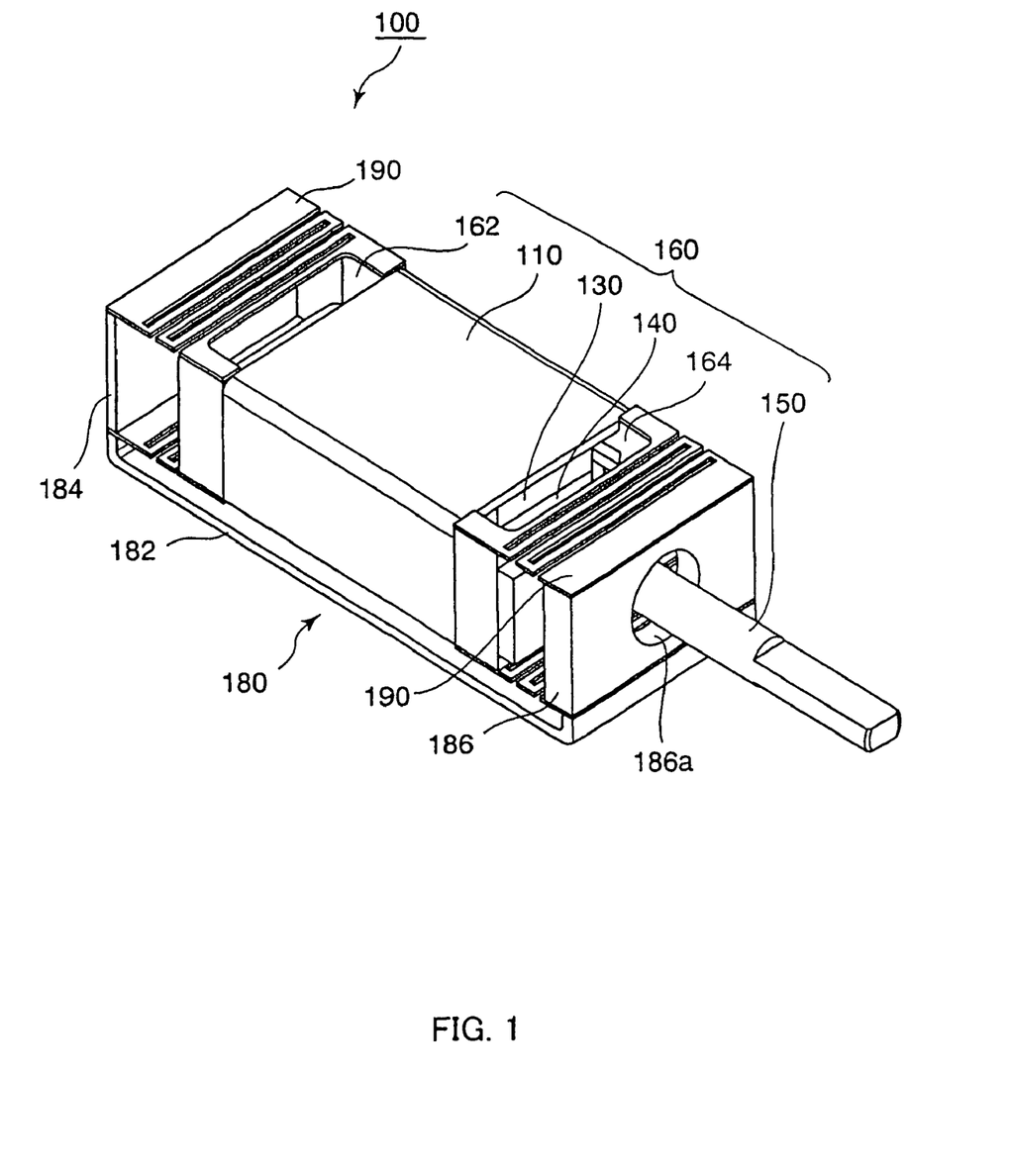
FIG. 1 is a perspective view showing an actuator according to Embodiment 1 of the present invention.
Figure 2:
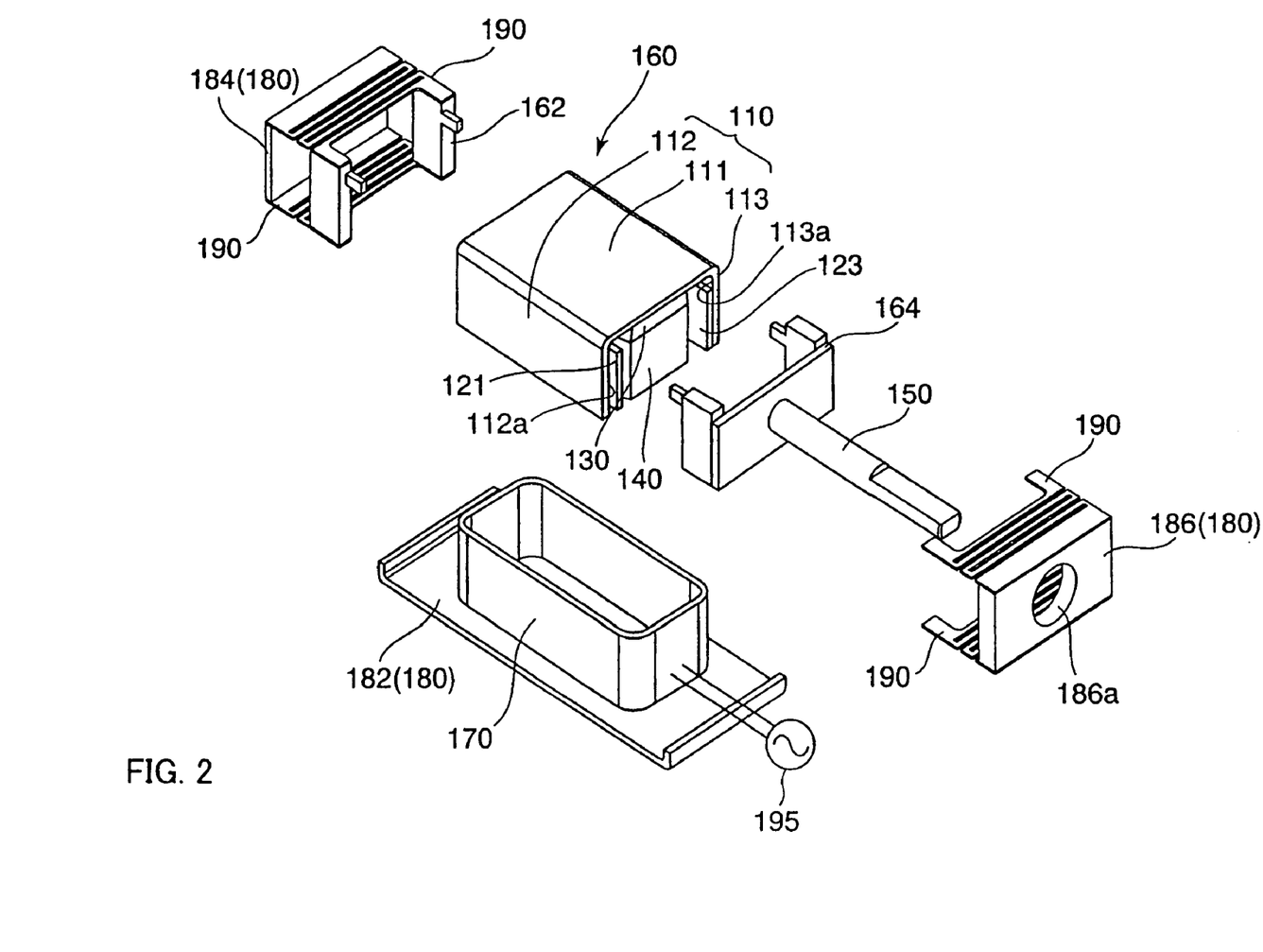
FIG. 2 is an exploded perspective view showing main parts of the actuator.
Figure 3:
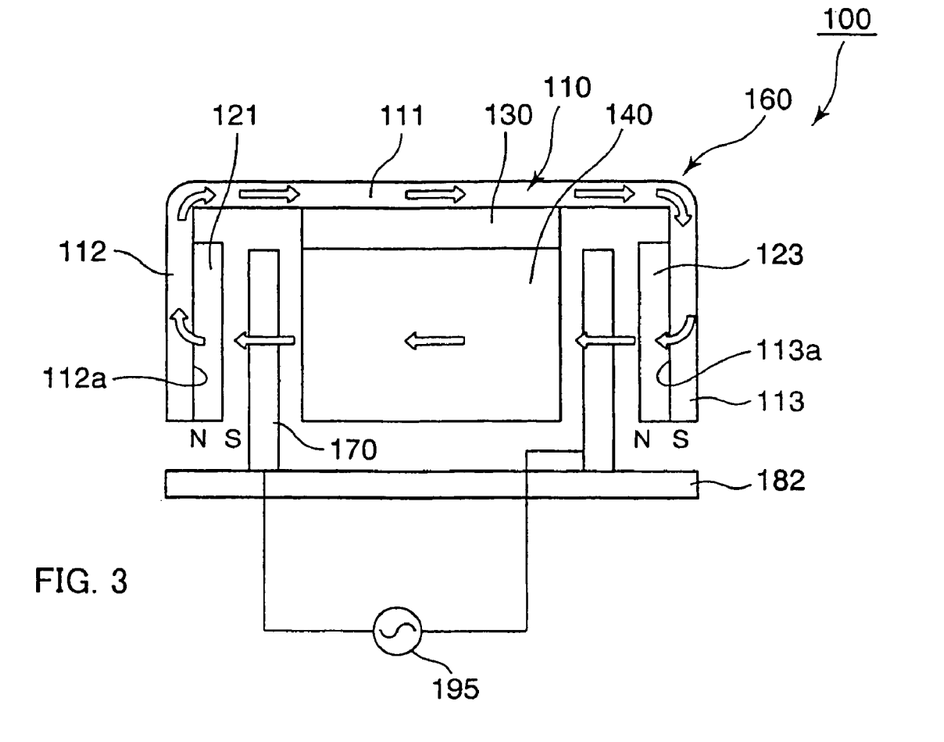
FIG. 3 is a schematic cross-sectional view showing configurations of a movable body and fixed body in the actuator.

FIG. 1 is a perspective view showing actuator 100 according to Embodiment 1 of the present invention. FIG. 2 is an exploded perspective view showing main parts of the actuator. FIG. 3 is a schematic cross-sectional view showing configurations of a movable body and fixed body in actuator 100.

As shown in FIG. 1, actuator 100 has movable body 160, fixed body 180, elastic bodies 190 that movably support movable body 160 in fixed body 180, and alternating current supplying section 195 (FIG. 2 and FIG. 3).

Movable body 160 has outer yoke 110, magnets 121 and 123 (FIG. 2 and FIG. 3), non-magnetic body 130, center yoke 140, elastic body connecting parts 162 and 164, and back-and-forth rotating vibration transmission shaft (hereinafter "shaft") 150 provided in movable body 160.

Fixed body 180 has base 182, support walls 184 and 186 and coil 170. In fixed body 180, coil 170 is located in the center part of the surface of base 182 which has a long rectangular plate shape extending in the direction in which shaft 150 extends. Further, support walls 184 and 186 are provided upright from side edges spaced apart in the longitudinal direction of base 182. Furthermore, as shown in FIG. 2, alternating current power is supplied from alternating current supplying section 195 to coil 170.

As shown in FIG. 1 to FIG. 3, outer yoke 110 forms a virtually U-shaped cross section and is formed by bending a flat magnetic body. Outer yoke 110 has rectangular flat yoke center part 111 and sidewalls 112 and 113 that drop from both side edges of yoke center part 111 and that oppose each other.

Outer yoke 110 is attached with elastic body connecting parts 162 and 164 connected with support walls 184 and 186 through elastic bodies 190, in the ends (i.e. ends spaced apart in the, direction in which both side edges extend) spaced apart in the longitudinal direction of outer yoke 110 (corresponding to the direction in which shaft 150 extends).

One of elastic body connecting parts 162 and 164 is attached with shaft 150 projecting in the same direction as the direction in which outer yoke 110 extends. That is, shaft 150 is provided to project from elastic body connecting part 164 attached to outer yoke 110, in a virtually orthogonal direction with respect to the direction in which center yoke 140 opposes magnets 121 and 123.

This shaft 150 is attached to movable body 160 so as to be located on the shaft line passing on the center of gravity of movable body 160, and produces back-and-forth rotating vibration with movable body 160, and transmits the vibration to the outside.

Further, when actuator 100 is used in an electric toothbrush, shaft 150 is coupled with the toothbrush part having in the head part a hair bundle part provided on the same shaft center as shaft 150 and provided orthogonal to the axial direction.

As shown in FIG. 3, magnets 121 and 123 are attached virtually over the entire surfaces of inner wall planes 112a and 113a of sidewalls 112 and 113 of outer yoke 110 such that magnetic poles different from each other oppose each other. In case of the present embodiment, the S pole of magnet 121 and the N pole of magnet 123 oppose each other. Center yoke 140 is a magnetic body and is attached to the center part of outer yoke 110 through non-magnetic body 130. To be more specific, center yoke 140, which is a magnetic body, is provided between magnets 121 and 123 so as to drop from yoke center part 111 through non-magnetic body 130.

As shown in FIG. 3, center yoke 140 is a rectangular parallelepiped that extends in the direction in which outer yoke 110 extends and that has both sidewall planes of having an area of virtually the same shape as the opposing areas of magnets 121 and 123 opposing the lateral sides of center yoke 140. Center yoke 140 is fixed in yoke center part 111 such that air gaps are formed between center yoke 140 and magnets 121 and 123.

In the air gaps between center yoke 140 and magnets 121 and 123, coil 170 is located to be spaced apart from the sidewall planes of center yoke 140, magnets 121 and 123 and yoke center part 111 of outer yoke 110 and to encircle center yoke 140.

Coil 170 is a voice coil and is wound to surround the periphery of center yoke 140. To be more specific, coil 170 is wound in the direction orthogonal to the direction in which the sidewall planes of center yoke 140 oppose magnets 121 and 123.

As shown in FIG. 1 and FIG. 2, support walls 184 and 186, provided upright on base 182 on which this coil 170 is provided, are provided on limbs rising from both side edges spaced apart in the longitudinal direction of base 182. Support wall 186 has opening part 186a through which shaft 150 of movable body 160 is inserted.

By inserting shaft 150 through opening part 186a in this support wall 186, support walls 184 and 186 hold movable body 160 in the virtually horizontal direction through elastic bodies 190 bridging between support walls 184 and 186 and elastic body connecting parts 162 and 164.

Elastic bodies 190 displacably support movable body 160 in the left, right, front and back directions in the area where support walls 184 and 186 oppose each other and supports movable body 160 in the twisting direction of center yoke 140 and shaft 150. Here, elastic bodies 190 are formed with flat, zig-zag springs provided in the upper and lower ends of opposing planes between support walls 184 and 186 so as to project virtually horizontally in the opposing direction. That is, elastic bodies 190 are provided in a zig-zag arrangement such that a metal plate of a strip shape running from one end toward the other end repeats extending in one width direction and then turning back in the other width direction, and elastic bodies 190 themselves extend and contract in the twisting direction once the one end and the other end are fixed.

Through elastic bodies 190 configured in this way, movable body 160 is movably supported in the twisting direction by support walls 184 and 186 of fixed body 180 in the upper and lower edges of the ends orthogonal to the side edges.

When the inertia of movable body 160 is J and the spring constant in the twisting direction is $k_{sp}$, movable body 160 vibrates on fixed body 180 at the resonance frequency calculated by following equation 1.

[1]

$$f_0 = \frac{1}{2\pi}\sqrt{\frac{K_{sp}}{J}}$$ (Equation 1)

In actuator 100 of the present embodiment, alternating current supplying section 195 supplies to coil 170 an alternating current at a frequency virtually equal to resonance frequency $f_0$ of movable body 160. By this means, movable body 160 can be driven efficiently.

In movable body 160 and fixed body 180, outer yoke 110, magnets 121 and 123, center yoke 140 and coil 170 form a magnetic circuit.

Figure 4:
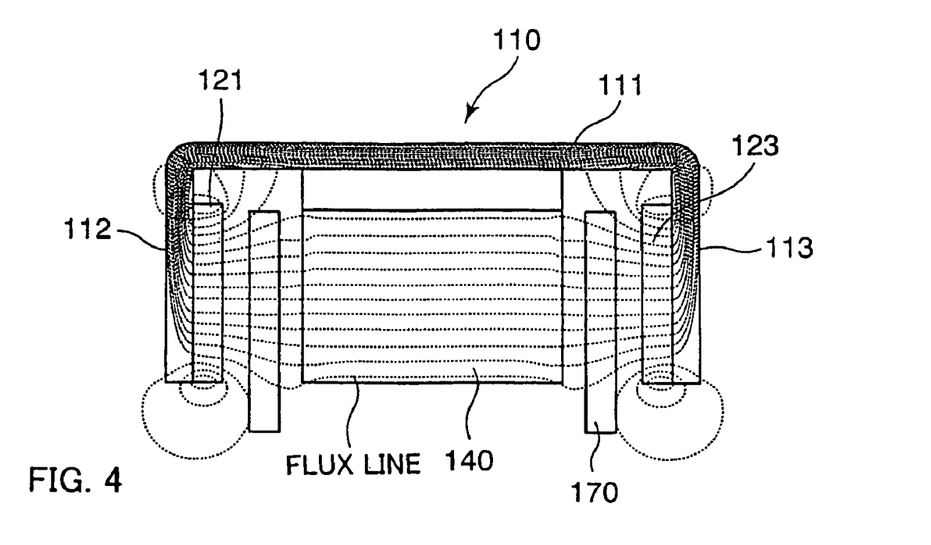
FIG. 4 is a flux line diagram showing a magnetic circuit in the actuator.

FIG. 4 is a flux line diagram showing a magnetic circuit in the actuator of Embodiment 1.

As shown in FIG. 3 and FIG. 4, in actuator 100, the fluxes (represented by outline arrows in FIG. 3) generated from one magnet pass the air gap in which coil 170 is located, center yoke 140, the air gap on the opposite side, the other magnet and outer yoke 110.

Next, the operation of actuator 100 will be described.

Movable body 160 in this actuator 100 adopts a spring mass type structure supported by fixed body 180 through elastic bodies 190, and, when an alternating current of a frequency equal to resonance frequency $f_0$ of movable body 160 is supplied to coil 170, movable body 160 is driven in a resonated state. The back-and-forth rotating vibration produced then is transmitted to shaft 150 of movable body 160.

Actuator 100 is driven based on the motion equation represented by following equation 2 and the circuit equation represented by following equation 3.

[2]

$$J\frac{d^2\theta(t)}{dt^2} = K_t i(t) - K_{sp}\theta(t) - D\frac{d\theta(t)}{dt} - T_{load}$$ (Equation 2)

J: inertia moment [Kgm2]
θ(t): angle [rad]
$K_t$: torque constant [Nm/A]
i(t): current [A]
$K_{sp}$: spring constant [Nm/rad]
D: attenuation coefficient [Nm/(rad/s)]
$T_{Load}$: load torque [Nm]

[3]

$$e(t) = Ri(t) + L\frac{di(t)}{dt} + K_e\frac{d\theta(t)}{dt}$$ (Equation 3)

e(t): voltage [V]
R: resistance [O]
L: inductance [H]
$K_e$: back electromotive force multiplier [V/(rad/s)]

That is, the inertia moment, rotation angle, torque constant, current, spring constant, attenuation coefficient and load torque can be changed appropriately within the range where equation 2 is met, and the voltage, resistance, inductance and back electromotive force multiplier can be changed appropriately within the range where equation 3 is met.

FIG. 5 is a schematic view for illustrating the operation of the actuator according to Embodiment 1. Further, although the outline arrows represent the flow of fluxes in a magnetic circuit in FIG. 5A, the flow is the same in FIG. 5B to FIG. 5D and illustration thereof will be omitted.

When the alternating current is supplied to coil 170 from alternating current supplying section 195, thrusts represented by arrows F1, F2, F3 and F4 in FIG. 5, are generated in coil 170 according to Fleming's left hand rule. By this means, in base 182 with coil 170 and movable body 160 attached to support walls 184 and 186 through elastic bodies 190, a torque where the center of gravity of rotation is the shaft center is generated.

The operation of actuator 100 in one cycle will be described.

Figure 5A:
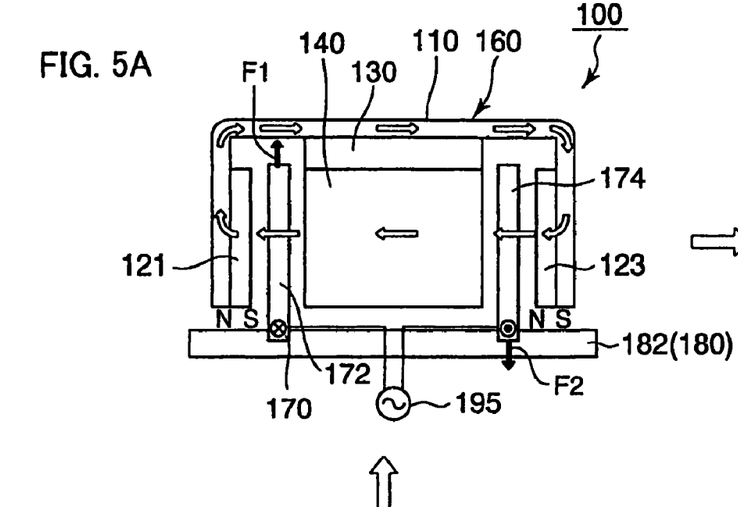
FIG. 5 is a schematic view illustrating the operation of the actuator.

When a current flows into coil 170 in the direction shown in FIG. 5A (this direction is referred to as "the forward current"), upward thrust F1 (in the direction toward outer yoke 110) is generated in part 172 of coil 170 opposing magnet 121, and downward thrust F2 (the direction toward base 182) is generated in part 174 of coil 170 opposing magnet 123.

Figure 5B:
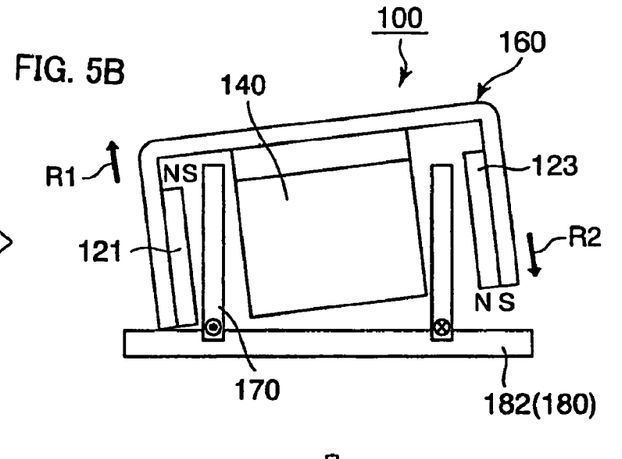

By this means, the opposing rotating force is generated in movable body 160 supported through elastic bodies 190 by support walls 184 and 186 rising from base 182 with coil 170 (see FIG. 1 and FIG. 2), so that movable body 160 can be moved to the location shown in FIG. 5B.

In actuator 100 in the state shown in FIG. 5B, reaction forces represented by arrows R1 and R2 are generated from the restoring forces of elastic bodies 190. From the state shown in FIG. 5B to the state shown in FIG. 5D, the current of the opposite direction to FIG. 5A is supplied to coil 170. By this means, from the state of FIG. 5B to the state of FIG. 5C, movable body 160 rotates clockwise with respect to fixed body 180 by the reaction forces represented by arrows R1 and R2 and the thrusts represented by arrows F3 and F4. Further, from the state of FIG. 5C to the state of FIG. 5D, movable body 160 rotates clockwise with respect to fixed body 180 by the thrusts represented by arrows F3 and F4.

Figure 5C:
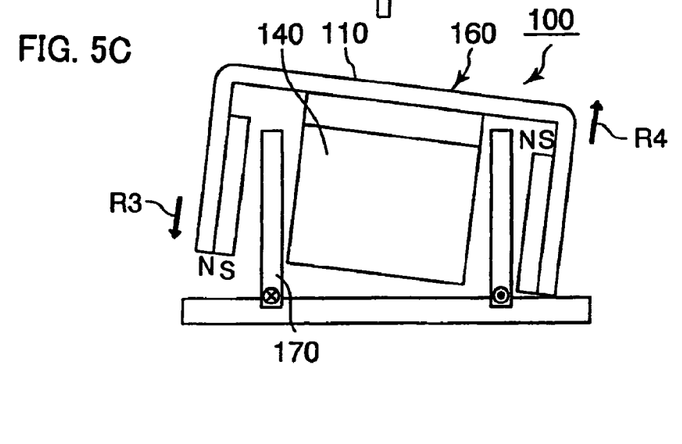
Figure 5D:
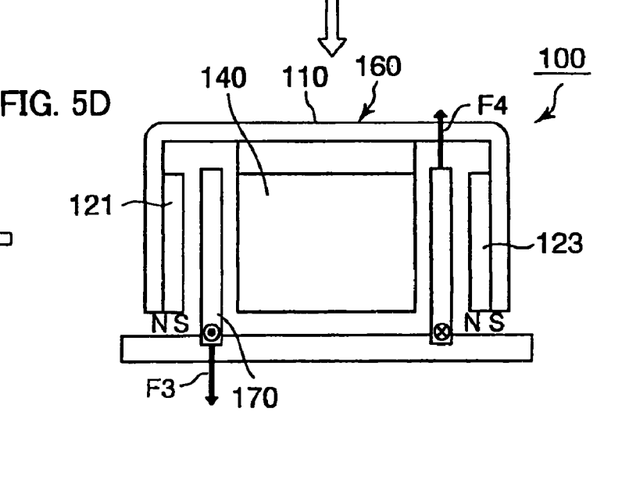

In actuator 100 in the state shown in FIG. 5D, the reaction forces represented by arrows R3 and R4 are generated from the restoring forces of elastic bodies 190. From the state shown in FIG. 5D through the state shown in FIG. 5A to the state shown in FIG. 5B, the forward current is supplied to coil 170. By this means, from the state of FIG. 5D to the state of FIG. 5A, movable body 160 rotates counterclockwise with respect to fixed body 180 by the reaction forces represented by arrows R3 and R4 and the thrusts represented by arrows F1 and F2. Further, from the state of FIG. 5A to the state of FIG. 5B, movable body 160 rotates counterclockwise with respect to fixed body 180 by the thrusts represented by arrows F1 and F2.

Next, the alternating current supplied in each state of FIG. 5 will be briefly described.

Figure 6A:
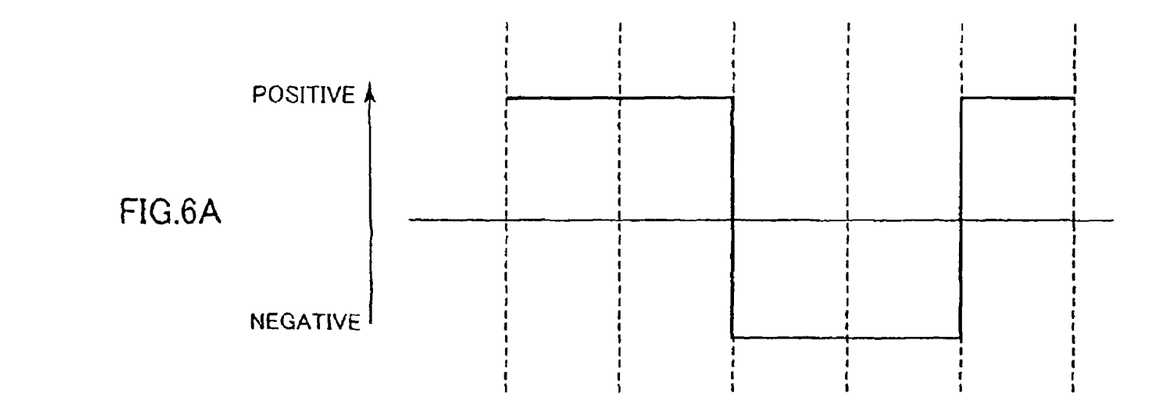
FIG. 6 shows the cycle of the alternating current supplied to a coil in an outer yoke.
Figure 6B:
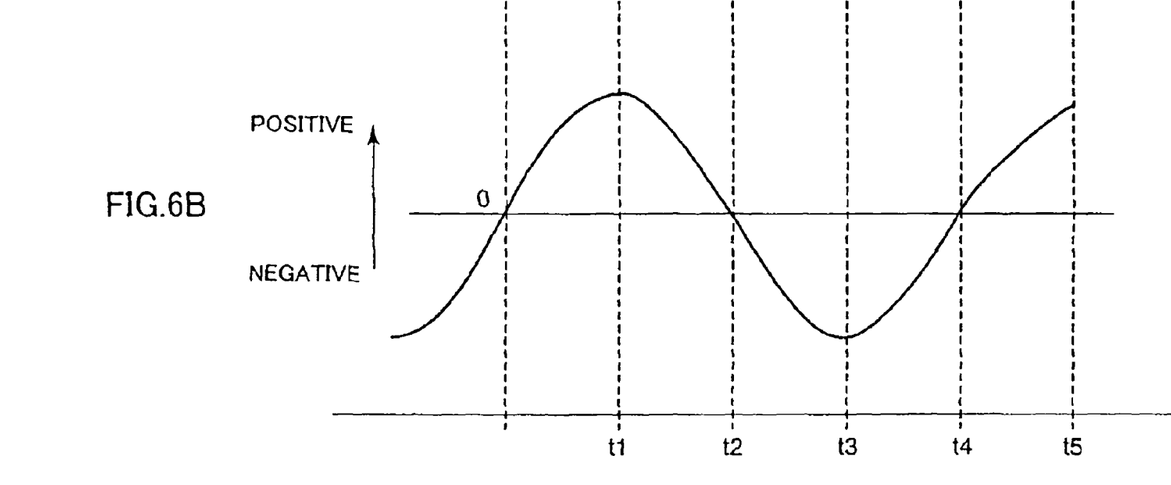

The alternating current flowing into the coil may be a pulse wave of frequency $f_0$ as shown in FIG. 6A or a sine wave of frequency $f_0$ as shown in FIG. 6B.

In the state of FIG. 5A, the forward current in time point t1 shown in FIG. 6 is supplied, in the state of FIG. 5B, the direction of the current is switched as shown in time point t2 of FIG. 6 and, in the state of FIG. 5C, the backward current in time point t3 shown in FIG. 6 is supplied. Further, in the state of FIG. 5D, the direction of the current is switched as shown in time point t4 of FIG. 6 and, in the state of FIG. 5D, the forward current in time point t5 shown in FIG. 6 is supplied. This is the operation in one cycle, and, by repeating such an operation, movable body 160 moves in back-and-forth rotating motion.

In actuator 100, movable body 160 moves in back-and-forth rotating motion, that is, produces back-and-forth rotating vibration, and this back-and-forth rotating vibration is outputted to the outside through shaft 150. When a toothbrush part having in the head part a hair bundle part provided orthogonal to the axial direction is coupled to shaft 150, the toothbrush part produces back-and-forth rotating vibration and enables rolling brushing.

In this way, actuator 100 is driven by the resonance phenomenon in which equations 2 and 3 are met and the resonance frequency represented by equation 1 is used. By this means, in actuator 100, only power consumed in the static state is the loss due to load torque and the loss due to friction, so that driving at low power consumption, that is, back-and-forth rotating vibration of movable body 160 at low power consumption, is possible.

As described above, actuator 100 according to the present embodiment allows miniaturization by realizing back-and-forth rotating motion of, for example, an electric toothbrush without a drive transmitting mechanism which constitutes a separate entity from the drive source, and further realizes back-and-forth rotating motion at low power consumption. Further, it is possible to provide the same advantage with an electric toothbrush having actuator 100, and make the toothbrush smaller.

(Embodiment 2)

Figure 7:
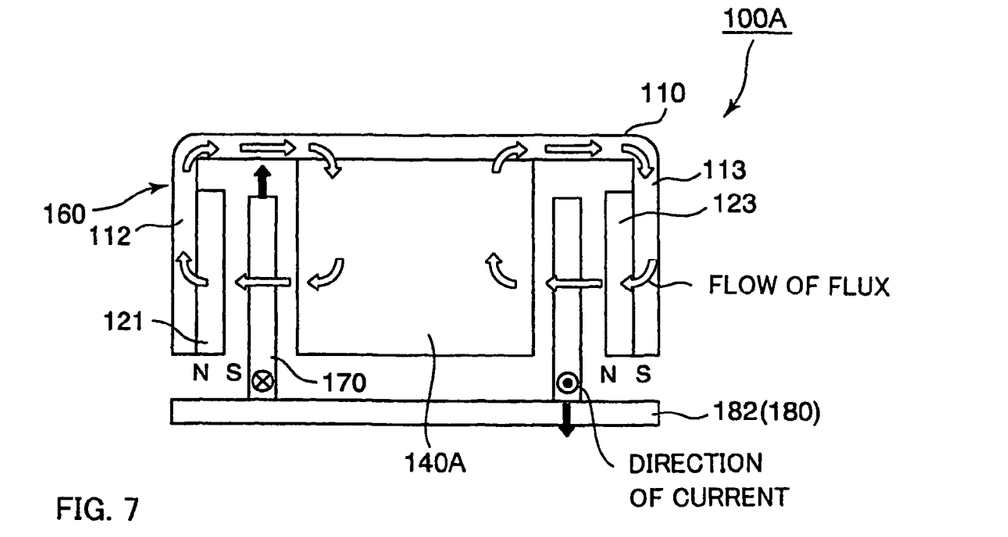
FIG. 7 is a cross-sectional view of main parts of the actuator according to Embodiment 2 of the present invention.
Figure 8:
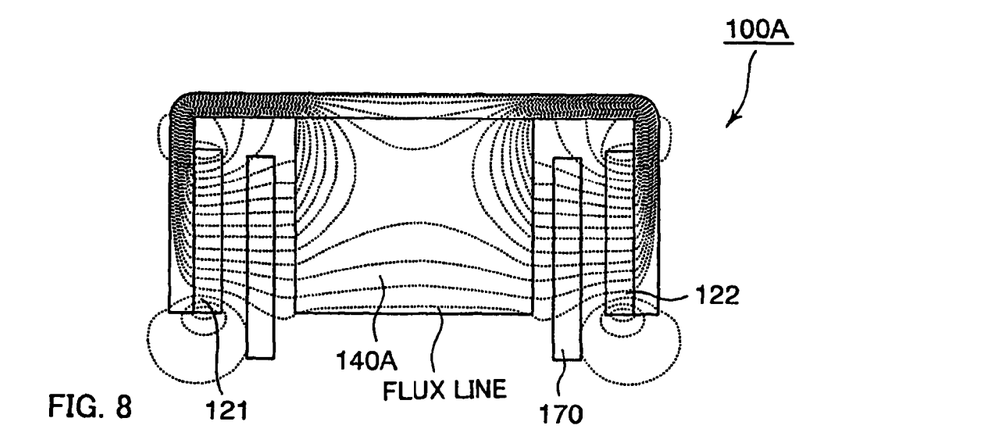
FIG. 8 shows flux lines of a magnetic circuit formed by the main components in the actuator.

FIG. 7 is a cross-sectional view of main parts showing the actuator according to Embodiment 2 of the present invention. FIG. 8 shows flux lines of a magnetic circuit formed by main components in the actuator. Further, the outline arrows shown in FIG. 7 show the flow of fluxes.

Actuator 100A of Embodiment 2 shown in FIG. 7 and FIG. 8 employs a configuration which removes non-magnetic element 130 and which attaches center yoke 140A directly to outer yoke 110, in the configuration of actuator 100 shown in FIG. 1 to FIG. 5.

Center yoke 140A is a magnetic body of a size combining center yoke 140 and non-magnetic body 130.

In actuator 100A, outer yoke 110, in which magnets 121 and 123 of different magnetic poles are provided opposing each other in inner wall planes located opposing each other spaced a predetermined interval apart, is provided integrally with center yoke 140A, which is a magnetic body located between magnets 121 and 123 through air gaps. The other configurations are the same as in the configuration of actuator 100, and will be assigned the same reference numerals and description of will be omitted.

That is, actuator 100A has: movable body 160; an output shaft provided in movable body 160; fixed body 180 that is located in the air gaps and that has coil 170 encircling center yoke 140A; elastic bodies 190 (see FIG. 1 and FIG. 2) which are elastic supporting parts movably supporting movable body 160 in fixed body 180; and alternating current supplying section 195 that supplies to the coil the alternating current of the frequency virtually equal to the resonance frequency of movable body 160.

In actuator 100A configured in this way, movable body 160, outer yoke 110 and center yoke 140A form an E-shaped magnetic circuit shown in FIG. 7 and FIG. 8.

Although the magnetic circuit of actuator 100A is different from the magnetic circuit of actuator 100 according to Embodiment 1, the flow of fluxes flowing between the air gaps, that is, the flow of fluxes in the parts of coil 170 opposing magnets 121 and 124, is the same as in Embodiment 1, so that actuator 100A can realize back-and-forth rotating vibration as in Embodiment 1. Further, in movable body 160, center yoke 140A is provided in outer yoke 110 without non-magnetic body 130, so that the configuration of the yoke center part can be simplified, thereby reducing the number of parts and man-hour for assembly and consequently making a cheaper actuator.

(Embodiment 3)

Figure 9:
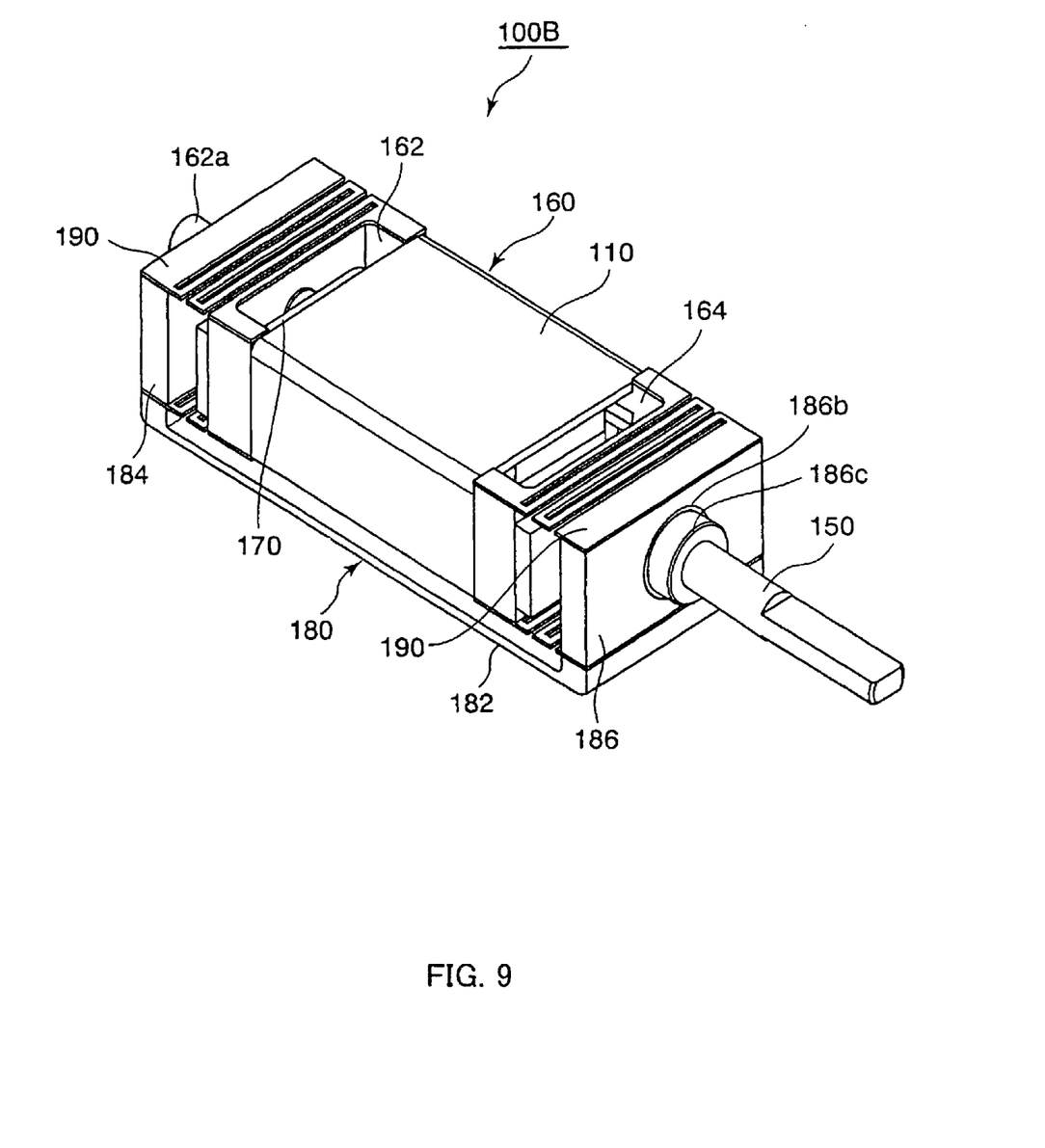
FIG. 9 is a perspective view showing the actuator according to Embodiment 3 of the present invention.
Figure 10:
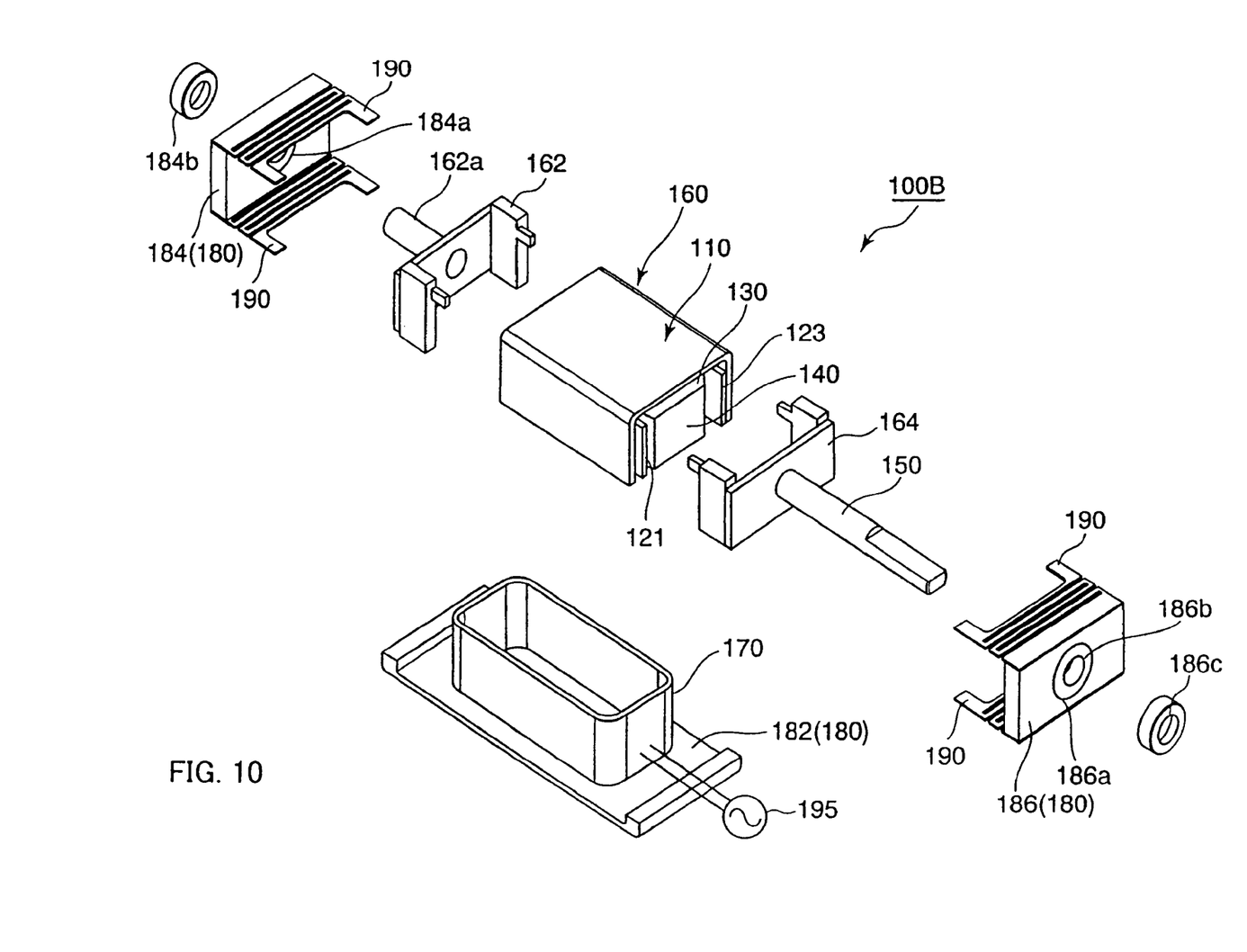
FIG. 10 is an exploded perspective view of the actuator.

FIG. 9 is a perspective view showing the actuator according to Embodiment 3 of the present invention, and FIG. 10 is an exploded perspective view of the actuator. Further, this actuator 100B has the same basic configuration as corresponding actuator 100 in Embodiment 1 shown in FIG. 1, and the same components will be assigned the same reference numerals and description thereof will be omitted.

Actuator 100B employs a configuration where, in actuator 100, movable body 160 is rotatably and axially supported in fixed body 180. Here, in the configuration of actuator 100, movable body 160 is rotatably and axially supported on the same shaft center as shaft 150.

That is, in actuator 100B, bearing 186*b* is attached to opening part 186*a* of support wall 186 through which shaft 150 is inserted in the configuration of actuator 100. Support wall 186 rotatably supports shaft 150 through bearing 186*b*. Further, bush 186*c* fits onto the part of shaft 150 projecting from support wall 186.

Furthermore, in elastic body connecting part 162 attached to outer yoke 110, support shaft part 162*a* located on the same shaft center as shaft 150 is provided projecting in the direction opposite to the direction in which shaft 150 projects. Support shaft part 162*a* has virtually the same external diameter as the shaft.

Bearing 184*a*, through which support shaft part 162*a* is inserted, is attached to support wall 184 connected with this elastic body connecting part 162 through elastic bodies 190. Bush 184*b* fits onto the end of support shaft part 162*a* inserted through bearing 184*a* of support wall 184, in the back of support wall 184.

In this way, in actuator 100B, movable body 160 is rotatably and axially supported by support walls 184 and 186 by means of support shaft part 162*a* and shaft 150. Therefore, in actuator 100B, an alternating current is supplied to coil 170 from alternating current supplying section 195 and back-and-forth rotating vibration is stably produced around the shaft center of shaft 150 with respect to fixed body 180.

Consequently, it is possible to provide the degree of freedom only in rotation and the axial direction, improve shock robustness of actuator 100 itself and stably allows back-and-forth rotating vibration of movable body 160.

Further, in actuator 100B, shaft 150 that transmits and outputs the movable motion of movable body 160 is used as the shaft part to axially support movable body 160 in fixed body 180.

Further, although this actuator 100B adopts a structure in which center yoke 140 is fixed to outer yoke 110 through non-magnetic body 130, the magnetic circuit of movable body 160 itself may be formed in an E shape by attaching center yoke 140 directly to outer yoke 110 to include the magnetic circuit shown in actuator 100A.

(Embodiment 4)

Figure 11:
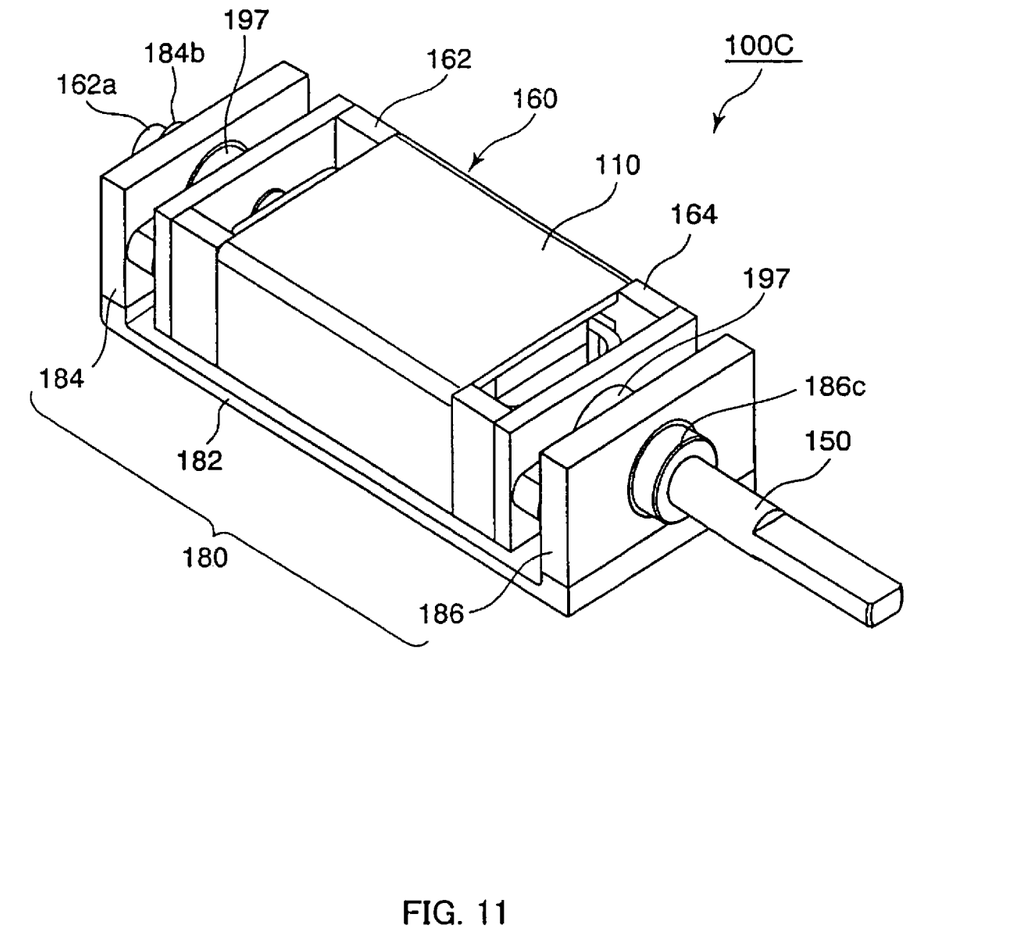
FIG. 11 is a perspective view showing the actuator according to Embodiment 4 of the present invention.
Figure 12:
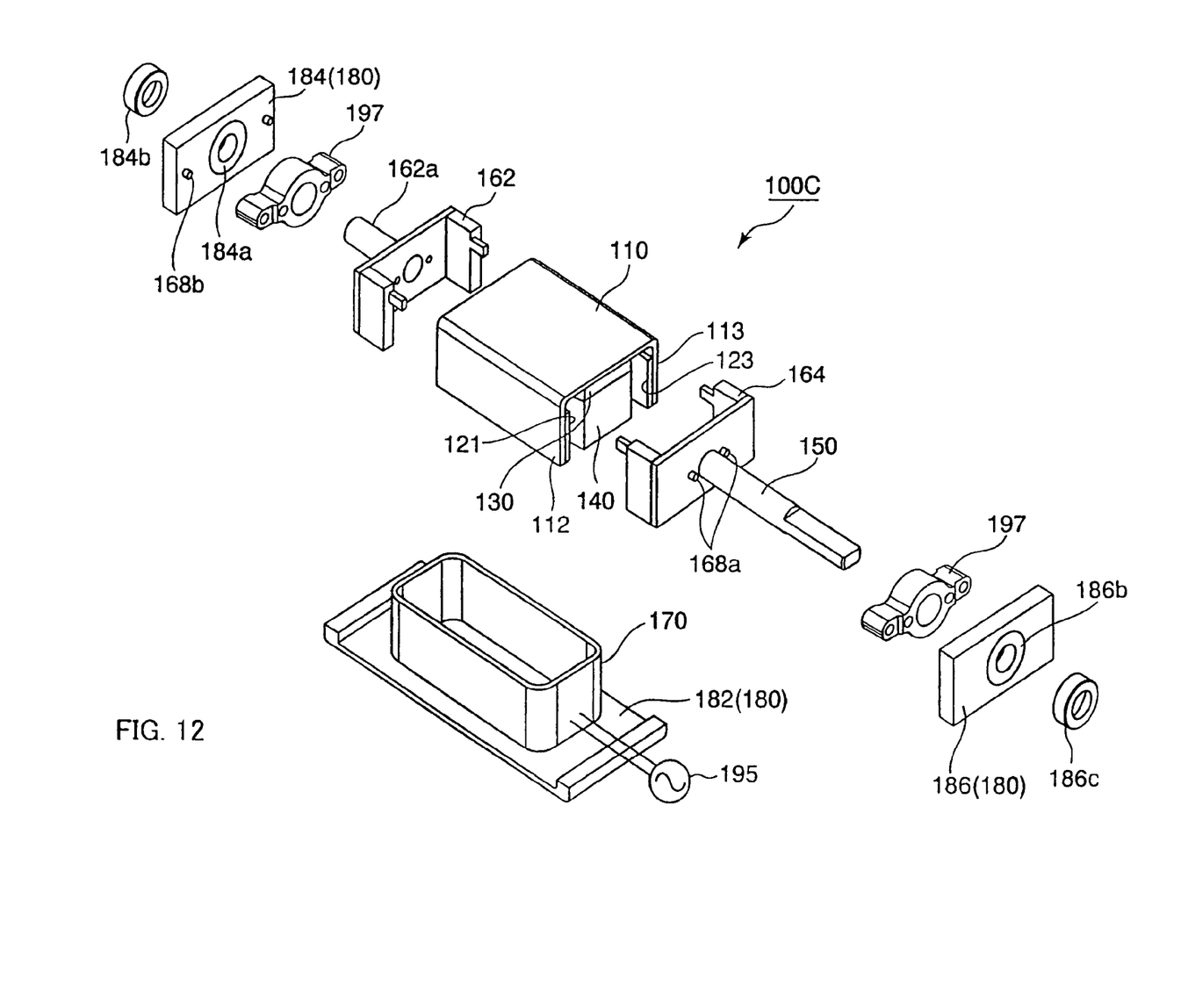
FIG. 12 is an exploded perspective view of the decomposed actuator.
Figure 13:
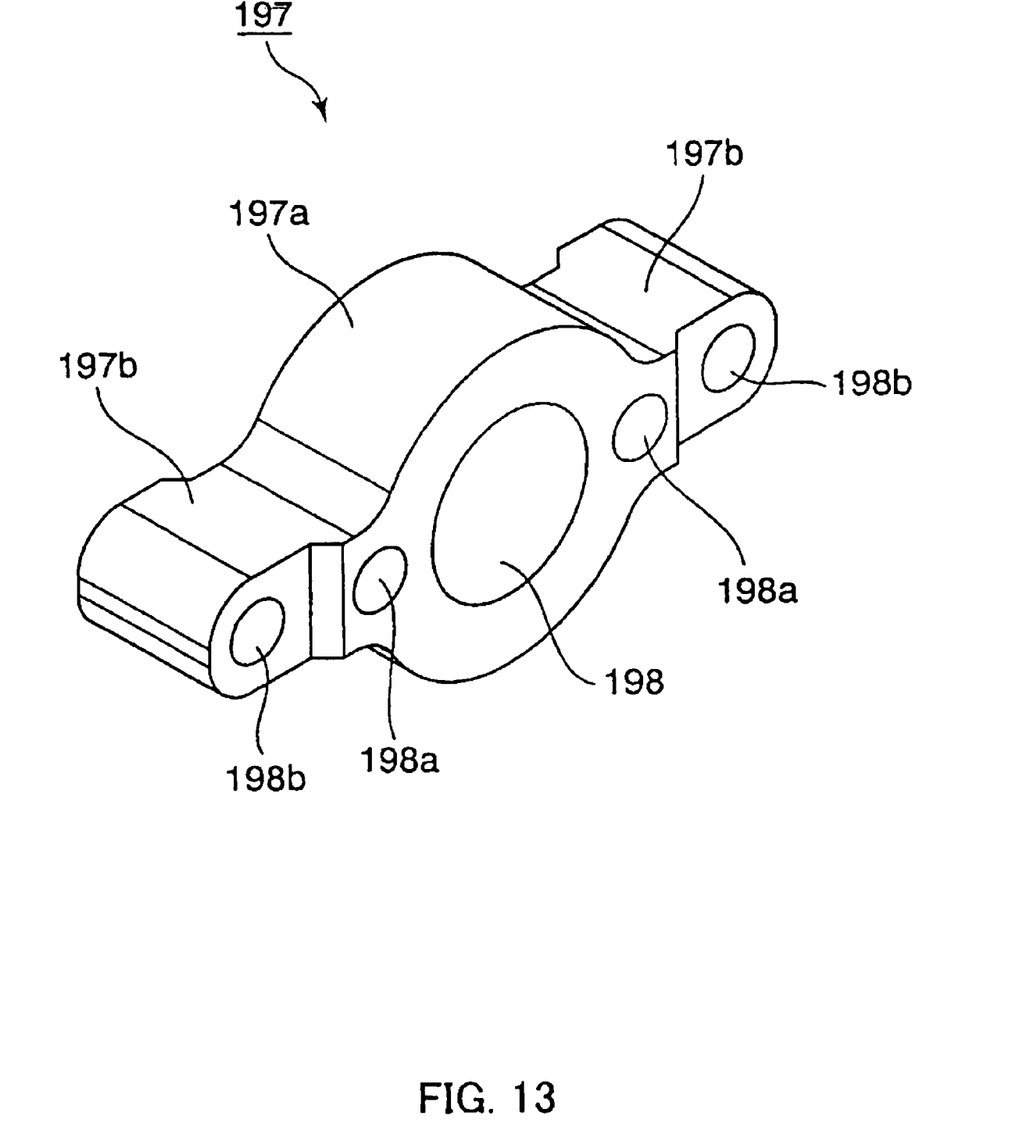
FIG. 13 shows an elastomer which is a viscoelastic body used in the actuator.

FIG. 11 is a perspective view showing the actuator according to Embodiment 4 of the present invention, FIG. 12 is an exploded perspective view of the actuator, and FIG. 13 shows an elastomer, which is a viscoelastic body used in the actuator. Further, actuator 100C shown in FIG. 11 and FIG. 12 adopts a structure in which elastic bodies 190 are changed in corresponding actuator 100B in Embodiment 3 shown in FIG. 9 and FIG. 10, and other configurations are the same. Therefore, the same components will be assigned the same reference numerals and description thereof will be omitted.

In actuator 100C, elastomers 197 that are viscoelastic bodies, in which the degree of attenuation is significant, are used in the configuration of actuator 100B instead of elastic bodies 190 which are the same zig-zag springs as elastic bodies 190 of actuator 100.

As shown in FIG. 13, elastomer 197 has center part 197a with inserting through-hole 198 through which support shaft part 162a and shaft 150 are inserted and arm parts 197b projecting from center part 197a in the direction orthogonal to the shaft center of support shaft part 162a and shaft 150.

Elastomer 197 is located between support wall 184 (186) and elastic body connecting part 162 (164) and functions as a spring. In elastomer 197, projections 168a and 168b of support wall 184 (186) and elastic body connecting part 162 (164) fit in holes 198a and 198b formed in locations drifted in the direction in which arm parts 197b extend. Here, in arm parts 197b of elastomer 197, projections 168a of elastic body connecting part 162 (164) are pressed to fit in holes 198a located close to center part 197a. Further, projections 168b of support wall 184 (186) are pressed to fit in holes 198b located far from center part 197a.

Actuator 100C is able to provide the same advantage as in Embodiment 3, and elastomer 197 can be attached to support wall 184 (186) and elastic body connecting part 162 (164) by arranging elastomer 197 between support wall 184 (186) and elastic body connecting part 162 (164) and pressing against projections 168a and 168b of support wall 184 (186) and elastic body connecting part 162 (164) to fit in holes 198a and 198b. By this means, unlike a case where a metal spring such as a zig-zag spring is used, troublesome attachment processes such as screwing with screws or bonding are not required, so that the assembly design of actuator 100C itself can be improved.

Further, although this actuator 100C adopts a structure in which center yoke 140 is fixed to outer yoke 110 through non-magnetic body 130, the magnetic circuit of movable body 160 itself may be formed in an E-shape by attaching center yoke 140 directly to outer yoke 110 to include the magnetic circuit shown in actuator 100A.

Further, outer yoke 110 in the above embodiments has inner wall planes in which magnets 121 and 123 of different magnetic properties are attached opposing each other. Outer yoke 110 may be configured in any way as long as outer yoke 110, coil 170 and center yoke 140 form a magnetic circuit. Therefore, the entirety of outer yoke 110 may be shaped in an arc-shaped cross section or the yoke body part may be formed in an arc shape.

Further, the above present invention can be variously modified without departing from the spirit of the present invention, and it naturally follows that the present invention embraces the modifications.

The actuator according to the present invention produces advantages of allowing miniaturization by realizing back-and-forth rotating motion of, for example, an electric toothbrush without a drive transmitting mechanism which constitutes a separate entity from a drive source, and is useful as the actuator that produces back-and-forth rotating vibration and that is used in, for example, an electric toothbrush.

What is claimed is:

1. An actuator comprising:
   a movable body that comprises:
      an outer yoke, which comprises inner wall planes located opposing each other spaced a predetermined interval apart, and in which magnets of different magnetic poles are provided opposing each other in the opposing inner wall planes; and
      a magnetic body located between the magnets through air gaps;
   an output shaft provided in the movable body;
   a fixed body that comprises a coil which is located in the air gaps and which encircles the magnetic body;
   an elastic support part that movably supports the movable body in the fixed body; and
   an alternating current supplying section that supplies to the coil an alternating current of a frequency substantially equal to a resonance frequency of the movable body, wherein
   the movable body is supported through the elastic support part by the fixed body at an end orthogonal to an inner wall plane of the movable body, and
   the movable body moves in a twisting direction of the magnetic body and the output shaft during actuation of the actuator.

2. The actuator according to claim 1, wherein the magnetic body is fixed to the outer yoke through a non-magnetic body.

3. The actuator according to claim 1, wherein the magnetic body is provided directly in the outer yoke.

4. The actuator according to claim 1, wherein the movable body is axially supported in the fixed body such that the movable body is rotatable around the output shaft.

5. The actuator according to claim 1, wherein the elastic support part comprises a viscoelastic body interposed between the fixed body and the movable body.

6. An electric toothbrush comprising:
   an actuator according to claim 1; and
   a toothbrush part that is coupled to an output shaft of the actuator on the same shaft center as the output shaft and that comprises in a head part a hair bundle part provided orthogonal to an axial direction.

* * * * *